US012712639B2

(12) United States Patent
Vinayachandran et al.

(10) Patent No.: US 12,712,639 B2
(45) Date of Patent: Aug. 18, 2026

(54) TRAINING APPARATUS, CONTROL METHOD, AND NON-TRANSITORY COMPUTER-READABLE STORAGE MEDIUM

(71) Applicant: NEC Corporation, Tokyo (JP)

(72) Inventors: Ankith Vinayachandran, Tokyo (JP); Naoto Ishii, Tokyo (JP); Emmanuel Le Taillandier De Gabory, Tokyo (JP)

(73) Assignee: NEC CORPORATION, Tokyo (JP)

( * ) Notice: Subject to any disclaimer, the term of this patent is extended or adjusted under 35 U.S.C. 154(b) by 343 days.

(21) Appl. No.: 18/563,461

(22) PCT Filed: May 28, 2021

(86) PCT No.: PCT/JP2021/020471

§ 371 (c)(1),
(2) Date: Nov. 22, 2023

(87) PCT Pub. No.: WO2022/249465

PCT Pub. Date: Dec. 1, 2022

(65) Prior Publication Data

US 2024/0235692 A1 Jul. 11, 2024

(51) Int. Cl.
*H04B 10/61* (2013.01)

(52) U.S. Cl.
CPC .................................... *H04B 10/61* (2013.01)

(58) Field of Classification Search
CPC ...... H04B 10/2507–2572; H04B 10/58; H04B 10/588; H04B 10/616–6163; H04B 10/697–6971
See application file for complete search history.

(56) References Cited

U.S. PATENT DOCUMENTS

2021/0028973 A1* 1/2021 Côté ........................ G06N 3/09
2022/0131613 A1* 4/2022 Beacall ................. H04L 27/362
2022/0343176 A1* 10/2022 Schmogrow ........ H04L 43/0876

FOREIGN PATENT DOCUMENTS

WO 2021/008705 A1 1/2021

OTHER PUBLICATIONS

B. Karanov, M. Chagnon, V. Aref, D. Lavery, P. Bayvel and L. Schmalen, "Concept and Experimental Demonstration of Optical IM/DD End-to-End System Optimization using a Generative Model," 2020 Optical Fiber Communications Conference and Exhibition (OFC), San Diego, CA, USA, 2020, pp. 1-3. (Year: 2020).*

(Continued)

*Primary Examiner* — Nathan M Cors
(74) *Attorney, Agent, or Firm* — Sughrue Mion, PLLC

(57) ABSTRACT

A training apparatus (2000) acquire a first transmission symbol sequence and a second transmission symbol sequence. The first transmission symbol sequence is input to an optical transmission unit (112), and converted into an optical transmission signal. The second transmission symbol sequence is acquired by demodulating the optical transmission signal. The training apparatus (2000) executes a training of a set of a generator (200) and a discriminator (300) using a training dataset (10) that is generated based on the first and second transmission symbol sequence. The generator (200) is trained so as to generate a data that is determined as being the ground truth data by the discriminator (300). The discriminator (300) is trained so as to distinguish the ground truth data and the data generated by the generator (200). The training apparatus (2000) outputs parameter information (20) that includes trainable parameters of the generator (200).

20 Claims, 7 Drawing Sheets

(56) References Cited

OTHER PUBLICATIONS

Zhang, S., Yaman, F., Nakamura, K. et al. Field and lab experimental demonstration of nonlinear impairment compensation using neural networks. Nat Commun 10, 3033 (2019). https://doi.org/10.1038/s41467-019-10911-9. (Year: 2019).*

International Search Report for PCT Application No. PCT/JP2021/020471, mailed on Aug. 17, 2021.

G. Paryanti, H. Faig, L. Rokach and D. Sadot, “A Direct Learning Approach for Neural Network Based Pre-Distortion for Coherent Nonlinear Optical Transmitter,” IEEE, Journal of Lightwave Technology, vol. 38, No. 15, pp. 3883-3896, Aug. 1, 2020.

Dai, Xiaoxiao et al., Numerical simulation and experimental demonstration of accurate machine learning aided IQ time-skew and power-imbalance identification for coherent transmitters, Optics Express, Dec. 23, 2019. vol. 27, No. 26, pp. 38367-38381, Internet<URL: https://doi.org/10.1364/OE.27.038367>.

* cited by examiner

TRAINING APPARATUS, CONTROL METHOD, AND NON-TRANSITORY COMPUTER-READABLE STORAGE MEDIUM

This application is a National Stage Entry of PCT/JP2021/020471 filed on May 28, 2021, the contents of all of which are incorporated herein by reference, in their entirety.

TECHNICAL FIELD

The present disclosure generally relates to signal processing in optical communication systems.

BACKGROUND ART

In an optical communication system, messages are transmitted from a transmitter to a receiver through an optical fiber medium. In the transmitter, a digital signal is converted into an optical signal. Since this process is not ideal, unintended distortions are introduced into the optical signal.

The distortion included in the optical signal could cause misinterpretation of the messages at the receiver. Thus, methods are required to mitigate this distortion. For example, NPLI discloses a technique to perform a calibration of a pre-compensator using a neural network.

CITATION LIST

Non Patent Literature

NPLI: G. Paryanti, H. Faig, L. Rokach and D. Sadot, "A Direct Learning Approach for Neural Network Based Pre-Distortion for Coherent Nonlinear Optical Transmitter," IEEE, Journal of Lightwave Technology, vol. 38, no. 15, pp. 3883-3896, Aug. 1, 2020

SUMMARY OF INVENTION

Technical Problem

The inventors of the inventions disclosed in the present disclosure consider that there is room for increasing the accuracy of compensation for the distortion introduced into the optical signal by the transmitter. An objective of the present disclosure is to provide a technique to increase the accuracy of compensation for the distortion introduced into the optical signal by the transmitter.

Solution to Problem

The present disclosure provides a training apparatus that includes at least one processor and memory storing instructions. The at least one processor is configured to execute the instructions to: acquire a first transmission symbol sequence that is a sequence of symbols to be input to an optical transmission unit included in a transmitter, the optical transmission unit acquiring the first transmission symbol sequence, converting the first transmission symbol sequence into an optical transmission signal, and transmitting the optical transmission signal to a receiver; acquire a second transmission symbol sequence that is a sequence of symbols that is acquired by demodulating the optical transmission signal; generate a training dataset including an input data and a ground truth data based on the first and second transmission symbol sequence; execute a training of a set of a generator and a discriminator using the training dataset, the generator being trained so as to generate a data that is determined as being the ground truth data by the discriminator, the discriminator being trained so as to distinguish the ground truth data and the data generated by the generator; and output parameter information that includes trainable parameters of the generator.

The present disclosure provides a control method performed by a computer. The control method comprises: acquiring a first transmission symbol sequence that is a sequence of symbols to be input to an optical transmission unit included in a transmitter, the optical transmission unit acquiring the first transmission symbol sequence, converting the first transmission symbol sequence into an optical transmission signal, and transmitting the optical transmission signal to a receiver; acquiring a second transmission symbol sequence that is a sequence of symbols that is acquired by demodulating the optical transmission signal; generating a training dataset including an input data and a ground truth data based on the first and second transmission symbol sequence; executing a training of a set of a generator and a discriminator using the training dataset, the generator being trained so as to generate a data that is determined as being the ground truth data by the discriminator, the discriminator being trained so as to distinguish the ground truth data and the data generated by the generator; and outputting parameter information that includes trainable parameters of the generator.

The present disclosure provides a computer-readable storage medium storing a program that causes a computer to execute: acquiring a first transmission symbol sequence that is a sequence of symbols to be input to an optical transmission unit included in a transmitter, the optical transmission unit acquiring the first transmission symbol sequence, converting the first transmission symbol sequence into an optical transmission signal, and transmitting the optical transmission signal to a receiver; acquiring a second transmission symbol sequence that is a sequence of symbols that is acquired by demodulating the optical transmission signal; generating a training dataset including an input data and a ground truth data based on the first and second transmission symbol sequence; executing a training of a set of a generator and a discriminator using the training dataset, the generator being trained so as to generate a data that is determined as being the ground truth data by the discriminator, the discriminator being trained so as to distinguish the ground truth data and the data generated by the generator; and outputting parameter information that includes trainable parameters of the generator.

Advantageous Effects of Invention

According to the present disclosure, a technique to increase the accuracy of compensation for the distortion introduced into the optical signal by the transmitter is provided.

DESCRIPTION OF EMBODIMENTS

Example embodiments according to the present disclosure will be described hereinafter with reference to the drawings. The same numeral signs are assigned to the same elements throughout the drawings, and redundant explanations are omitted as necessary.

First Example Embodiment

<Overview>

Figure 1:
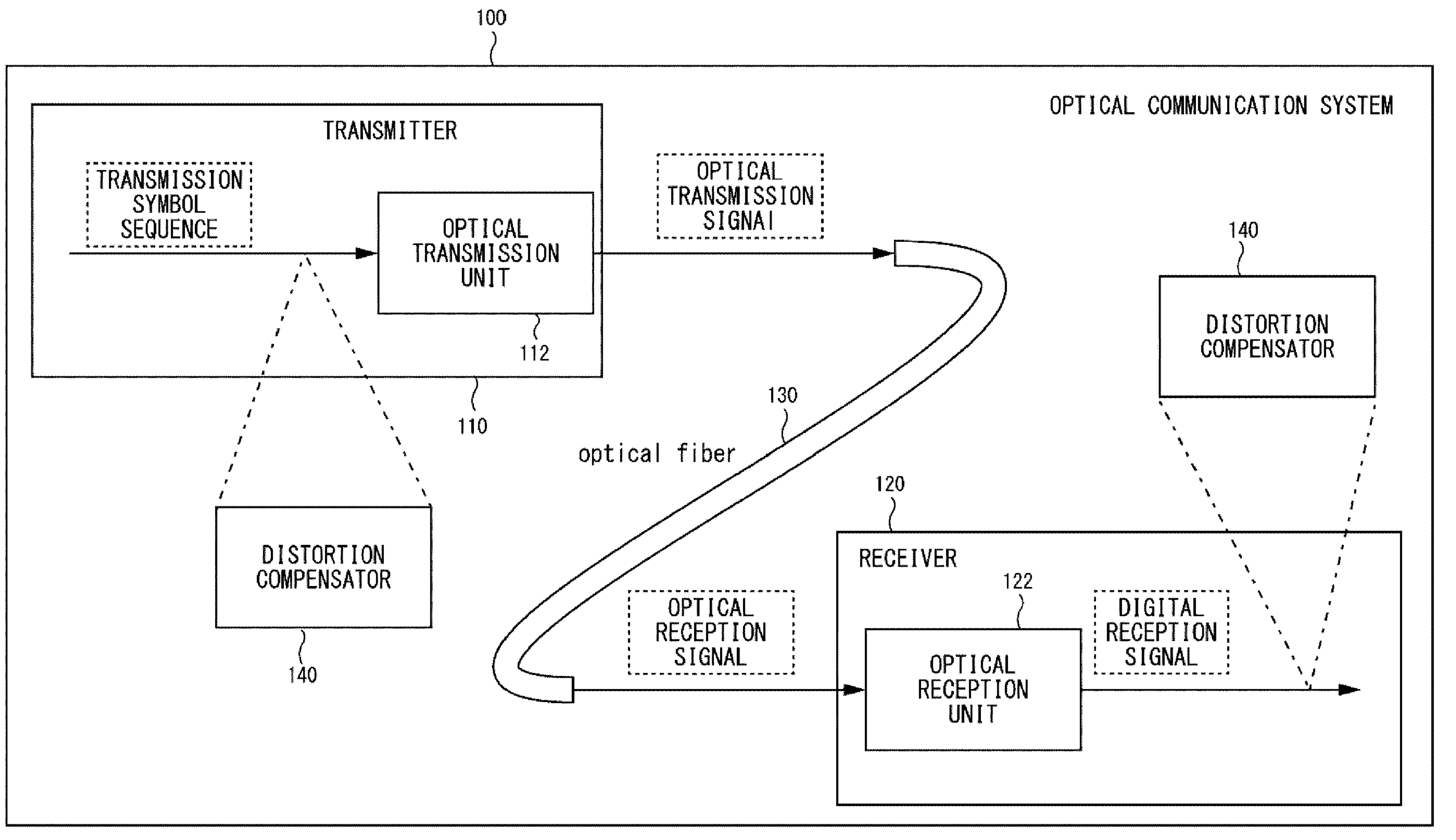
FIG. 1 illustrates an optical communication system for which the training apparatus of the first example embodiment generates parameter information.

FIG. 1 illustrates an optical communication system for which the training apparatus of the first example embodiment generates parameter information. The optical communication system 100 includes a transmitter 110, a receiver 120, and an optical fiber 130. The transmitter 110 includes an optical transmission unit 112 that acquires a transmission symbol sequence, converts the transmission symbol sequence into an optical transmission signal, and transmits the optical transmission signal to the receiver 120 through the optical fiber 130. The optical transmission unit 112 may constitute a Mach Zendar Modulator, a driving amplifier equipment and other signal processing and conversion equipment.

The transmission symbol sequence is a digital signal that represents a time series of symbols. The transmission symbol sequence is obtained as the result of encoding data that is to be transmitted to the receiver 120. In the case where the optical communication system 100 is a single channel optical communication system with single polarization, each symbol includes the in-phase and quadrature-phase components. Thus, in this case, the transmission symbol sequence includes a set of the in-phase and quadrature-phase components for each point in time.

The receiver 120 includes an optical reception unit 122 that receives the optical reception signal from the optical fiber 130, and converts the optical reception signal into a reception symbol sequence. The reception symbol sequence is a digital signal that represents a time series of symbols by which the data transmitted by the transmitter 110 is represented.

In addition to the above-mentioned components, the optical communication system 100 also includes a distortion compensator 140 that compensates for distortion that is introduced by the optical transmission unit 112 into the optical transmission signal. The distortion compensator 140 may be included in the transmitter 110 or the receiver 120. In the former case, the distortion compensator 140 is located before the optical transmission unit 112, and operates as a pre-compensator. The pre-compensator acquires the transmission symbol sequence, applies pre-distortion to the transmission symbol sequence, and passes on the pre-distorted sequence to the optical transmission unit 112.

In the latter case, the distortion compensator 140 is located after the optical reception unit 122, and operates as a post-compensator. The post-compensator acquires the reception symbol sequence from the optical reception unit 122 and applies post-distortion to the reception symbol sequence.

Figure 2:
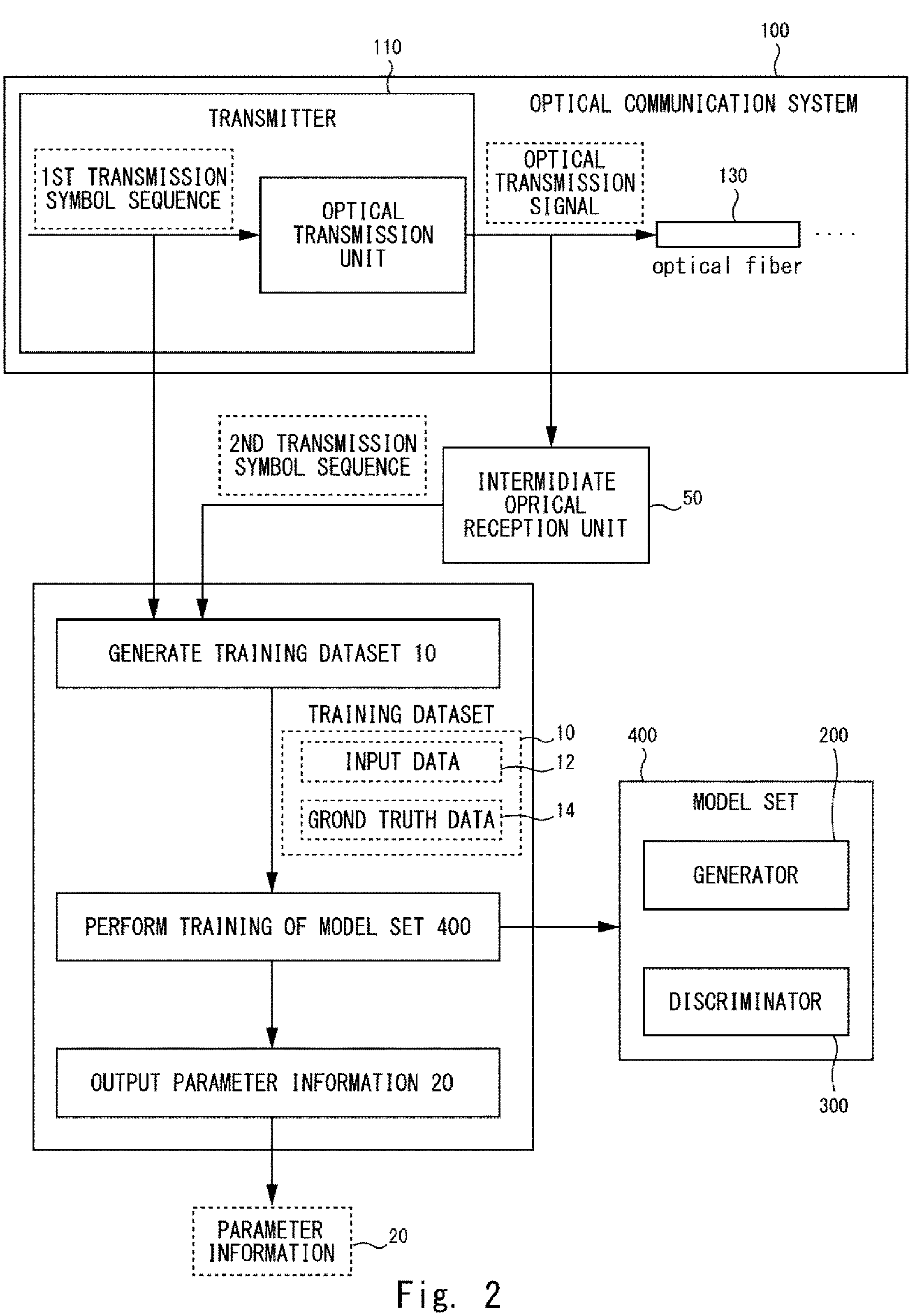
FIG. 2 illustrates an overview of the training apparatus of the first example embodiment.

FIG. 2 illustrates an overview of the training apparatus 2000 of the first example embodiment. Note that the overview illustrated by FIG. 2 shows an example of operations of the training apparatus 2000 to make it easy to understand the training apparatus 2000, and does not limit or narrow the scope of possible operations of the training apparatus 2000.

For a calibration of the distortion compensator 140 (in other words, in order to generate suitable parameters of the distortion compensator 140 with which the distortion compensator 140 performs pre-distortion or post-distortion), the training apparatus 2000 uses a set of machine learning-based models called a model set 400. The model set 400 includes a generator 200 and a discriminator 300, and may form a GAN (Generative Adversarial Networks).

The training apparatus 2000 performs a training of the model set 400 with a training dataset 10 including an input data 12 and a ground truth data 14. The training dataset 10 is generated such that the conversion of the input data 12 into the ground truth data 14 is substantially equivalent to the distortion compensation for the optical transmission signal. To do so, the training dataset 10 is generated using a set of a first transmission symbol sequence and a second transmission symbol sequence. The first transmission symbol sequence is a sequence of symbols that is input to the optical transmission unit 112. On the other hand, the second transmission symbol sequence is a sequence of symbols that is obtained by demodulating the optical transmission signal that is output from the optical transmission unit 112 in response to the first transmission symbol sequence being input thereinto. This demodulation of the optical transmission signal may be performed by an intermediate reception unit 50, which is installed for the purpose of generating the training data 10.

The training apparatus 2000 performs a GAN-like training for the model set 400. Specifically, the generator 200 is configured to acquire the input data 12, and is trained so that it can generate a data substantially similar to the ground truth data 14. On the other hand, the discriminator 300 is configured to acquire the ground truth data 14 or the data generated by the generator 200, and is trained so that it can distinguish those data. Since the training dataset 10 is generated such that the conversion of the input data 12 into the ground truth data 14 is substantially equivalent to the distortion compensation for the optical transmission signal, the above-mentioned training enables the generator 200 to perform the distortion compensation for the optical transmission signal (i.e. the pre-distortion for the transmission symbol sequence or the post-distortion for the reception symbol sequence).

After finishing the training of the model set 400, the training apparatus 2000 outputs parameter information 20 that at least includes trainable parameters of the generator 200. The distortion compensator 140 can be configured with the trainable parameters of the generator 200. By doing so, the distortion compensator 140 become capable of compensating for the distortion that is introduced by the optical transmission unit 112 into the optical transmission signal.

<Example of Advantageous Effect>

According to the training apparatus 2000, the parameters of the distortion compensator 140 is determined through the training of a set of the generator 200 and the discriminator 300 that form a GAN using the training data 10. Specifically, the generator 200 is configured to acquire the input data 12 and trained so that it can generate a data substantially similar to the ground truth data 14. On the other hand, the discriminator 300 is configured to acquire the ground truth data 14 or the data generated by the generator 200, and is trained so that it can distinguish those data. By determining the parameters of the distortion compensator 140 through this GAN-like training, it is possible to enable the distortion compensator 140 to accurately compensate for the distortion introduced into the optical transmission signal by the optical transmission unit 112.

Hereinafter, more detailed explanation of the training apparatus 2000 will be described.

<Example of Functional Configuration>

Figure 3:
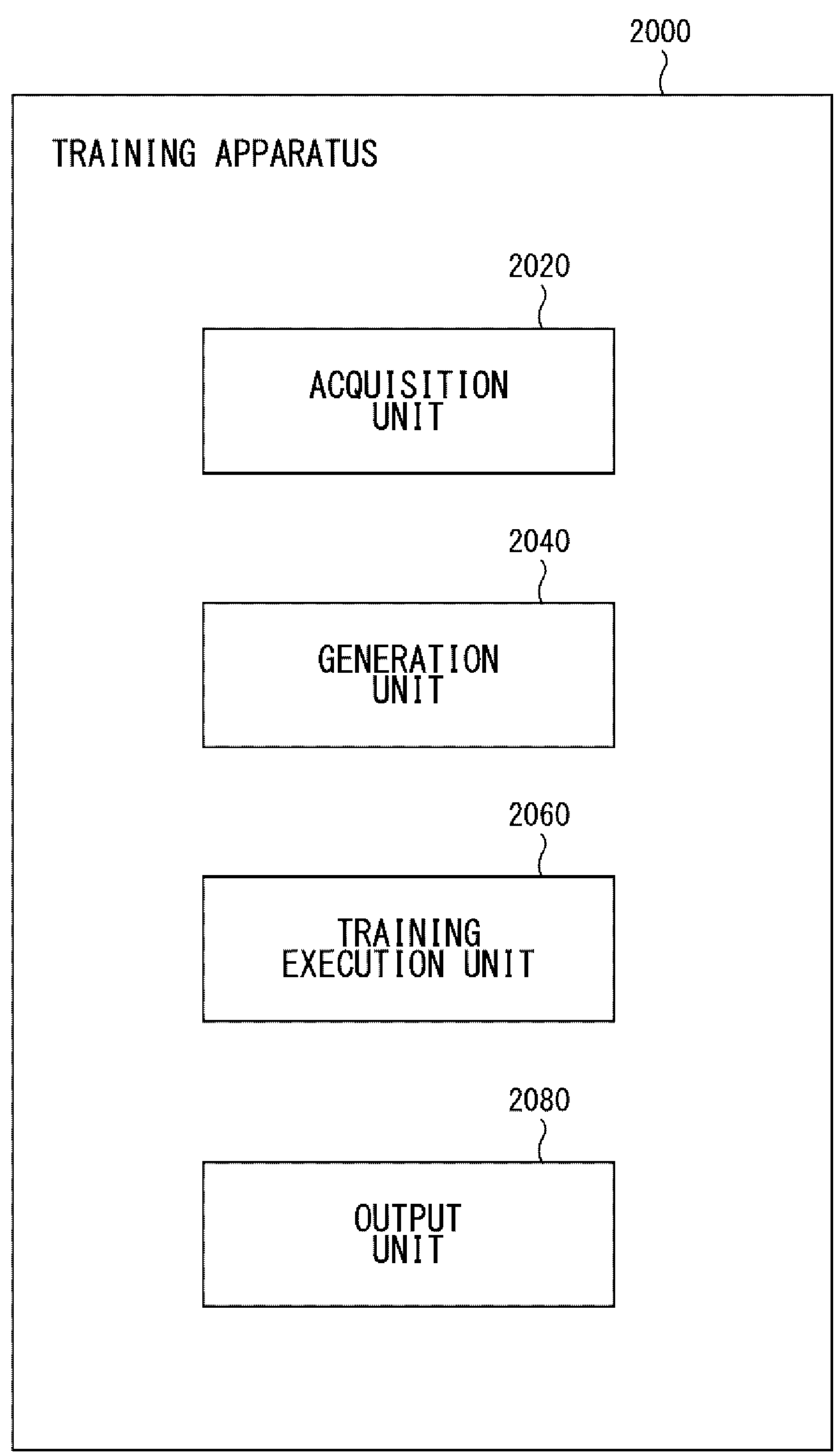
FIG. 3 is a block diagram illustrating an example of a functional configuration of the training apparatus.

FIG. 3 illustrates an example of a functional configuration of the training apparatus 2000. The training apparatus 2000 includes an acquisition unit 2020, a generation unit 2040, a training execution unit 2060, and an output unit 2080. The acquisition unit 2020 acquire a plurality of sets of the first and second transmission symbol sequences. The generation unit 2040 generates the training dataset 10 for each set of the first and second transmission symbol sequences. The training execution unit 2060 executes the training of the model set 400 using the training datasets 10. The output unit 2080 outputs the parameter information 20.

<Example of Hardware Configuration>

The training apparatus 2000 may be realized by one or more computers. Each of the one or more computers may be a special-purpose computer manufactured for implementing the training apparatus 2000, or may be a general-purpose computer like a personal computer (PC), a server machine, or a mobile device.

The training apparatus 2000 may be realized by installing an application in the computer. The application is implemented with a program that causes the computer to function as the training apparatus 2000. In other words, the program is an implementation of the functional units of the training apparatus 2000.

Figure 4:
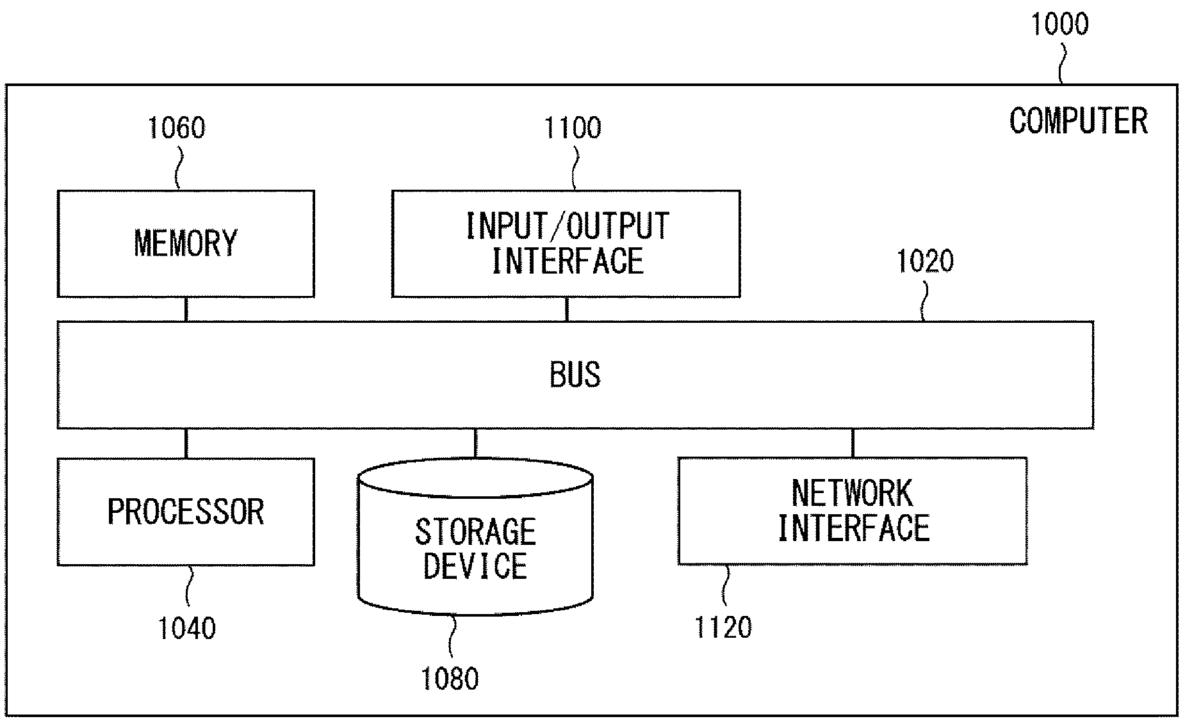
FIG. 4 is a block diagram illustrating an example of the hardware configuration of a computer realizing the training apparatus.

FIG. 4 is a block diagram illustrating an example of the hardware configuration of a computer 1000 realizing the training apparatus 2000. In FIG. 4, the computer 1000 includes a bus 1020, a processor 1040, a memory 1060, a storage device 1080, an input/output interface 1100, and a network interface 1120.

The bus 1020 is a data transmission channel in order for the processor 1040, the memory 1060, the storage device 1080, and the input/output interface 1100, and the network interface 1120 to mutually transmit and receive data. The processor 1040 is a processer, such as a CPU (Central Processing Unit), GPU (Graphics Processing Unit), or FPGA (Field-Programmable Gate Array). The memory 1060 is a primary memory component, such as a RAM (Random Access Memory) or a ROM (Read Only Memory). The storage device 1080 is a secondary memory component, such as a hard disk, an SSD (Solid State Drive), or a memory card. The input/output interface 1100 is an interface between the computer 1000 and peripheral devices, such as a keyboard, mouse, or display device. The network interface 1120 is an interface between the computer 1000 and a network. The network may be a LAN (Local Area Network) or a WAN (Wide Area Network).

The storage device 1080 may store the program mentioned above. The CPU 1040 executes the program to realize each functional unit of the training apparatus 2000.

The hardware configuration of the computer 1000 is not limited to the configuration shown in FIG. 4. For example, as mentioned-above, the training apparatus 2000 may be realized by plural computers. In this case, those computers may be connected with each other through the network.

<Flow of Process>

Figure 5:
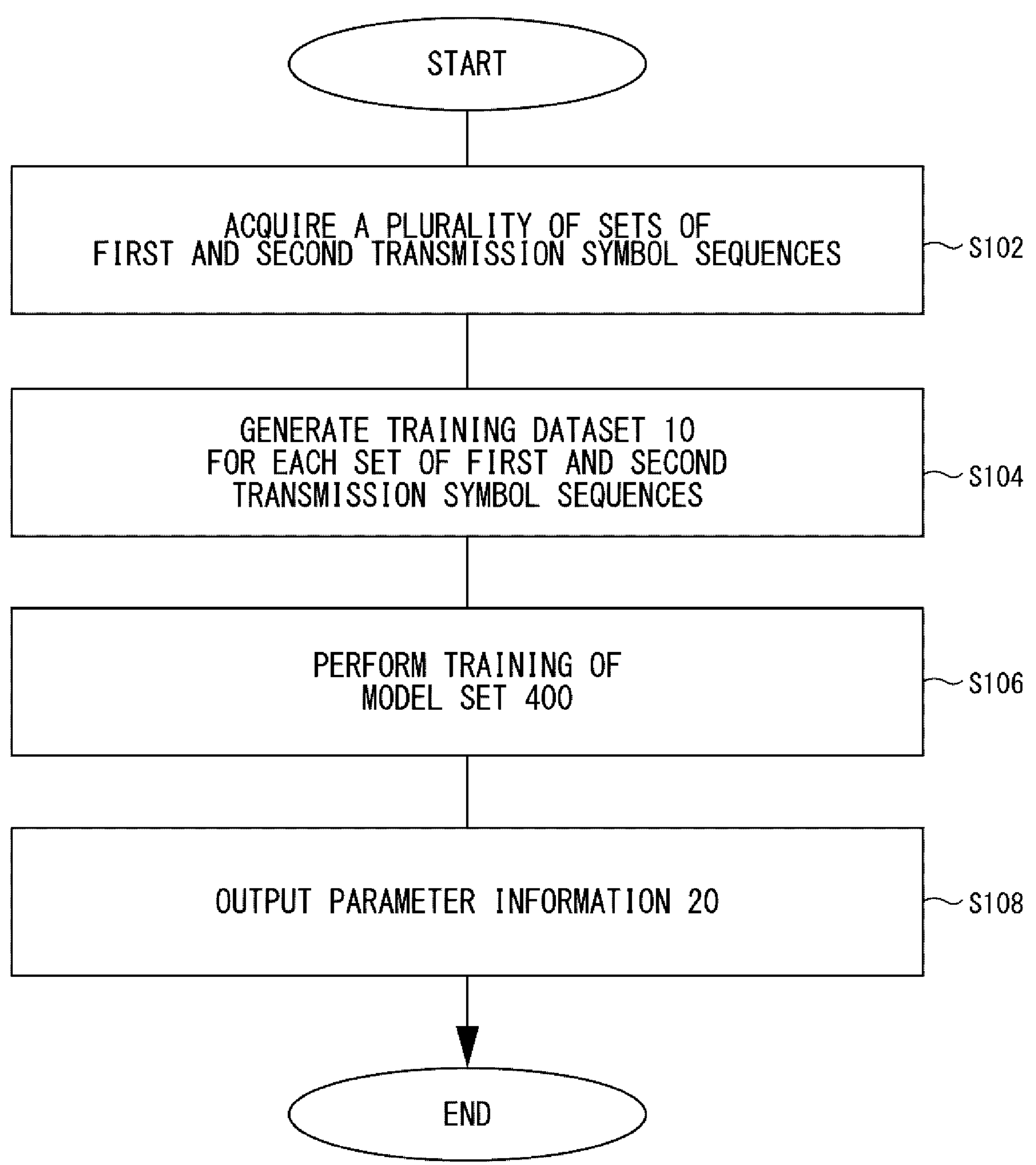
FIG. 5 is a flowchart illustrating an example of a process performed by the training apparatus 2000.

FIG. 5 is a flowchart illustrating an example of a process performed by the training apparatus 2000. The acquisition unit 2020 acquires the plurality of sets of the first and second transmission symbol sequences (S102). The generation unit 2040 generates a training dataset for each set of the first and second transmission symbol sequence (S104). The training execution unit 2060 executes the training of the model set 400 (S106). The output unit 2080 outputs the parameter information 20 (S108).

<Acquisition of First and Second Transmission Symbol Sequence: S102>

The acquisition unit 2020 acquires the plurality of sets of the first and second transmission symbol sequence. The first transmission symbol sequence may be an arbitrary digital signal that can be input into the optical transmission unit 112. The second transmission symbol sequence may be obtained by 1) inputting the first transmission symbol sequence into the optical transmission unit 112 and 2) converting the optical transmission signal output from the optical transmission unit 112 into a digital signal. The digital signal obtained by this conversion can be used as the second transmission symbol sequence. As described in FIG. 2, the conversion of the optical transmission signal into the second transmission symbol sequence may be performed by the intermediate optical reception unit 50.

The plurality of sets of the first and the second transmission symbol sequence may be prepared and stored in a storage device to which the training apparatus 2000 has access in advance. In this case, the acquisition unit 2020 may acquire the plurality of sets of the first and second transmission symbol sequence from the storage device. In another example, the training apparatus 2000 may receive the plurality of sets of the first and second transmission symbol sequence that is sent by an arbitrary computer.

<Generation of Training Dataset: S104>

The generation unit 2020 generates the training dataset 10 for each set of the first and second transmission symbol sequences (S104). As mentioned above, the training dataset 10 is generated such that the conversion of the input data 12 into the ground truth data 14 is substantially equivalent to the distortion compensation for the optical transmission signal.

The first example of such the training dataset 10 includes the first transmission symbol sequence as the input data 12, and an inverse signal of the distortion included in the second transmission symbol sequence as the ground truth data 14. Using this type of the training dataset 10, the generator 200 is trained to generate, from the first transmission symbol sequence, the inverse signal of the distortion included in the second transmission symbol sequence. The inverse signal of the distortion can be applied to the first transmission symbol sequence to offset the distortion introduced by the optical transmission unit 112. Thus, the trainable parameters of the generator 200 that is trained using the training dataset 10 of the first example can be applied to the distortion compensator 140 working as the pre-compensator.

The generation unit 2020 generates the inverse signal of the distortion as follows:

Equation 1

$$\text{Inverse Signal} = \text{Input Signal} - \lambda * (\mu * \text{Output Signal} - \text{input signal}) \quad (1)$$

wherein the input signal represents the first transmission symbol sequence: the output signal represents the second transmission symbol sequence: $\lambda$ represents a factor to introduce additional scaling on the distortion (Typically set to 1); and $\mu$ represents the scaling to account for the gain from the transmitter setup.

The second example of the training dataset 10 includes the second transmission symbol sequence as the input data 12, and the first transmission symbol sequence as the ground truth data 14. With this type of the training dataset 10, the generator is trained so as to generate the first transmission symbol sequence from the second transmission symbol sequence (in other words, to restore the original digital signal from the distorted one). This means that the generator 200 can operate as the post-compensator in this case. Thus, the trainable parameters of the generator 200 that is trained using the training dataset 10 of the second example can be applied to the distortion compensator 140 working as the post-compensator.

The third example of the training dataset 10 includes the second transmission symbol sequence that is normalized by its gain as the input data 12, and the first transmission symbol sequence as the ground truth data 14. The second transmission symbol sequence is normalized in order to remove the amplification added into the optical transmission signal by the optical transmitter 112, thereby making the input data 12 have the same range as the ground truth data 14. With this type of the training dataset 10, the generator is trained so as to generate the first transmission symbol sequence from the second transmission symbol sequence normalized by its gain. This means that the generator 200 can operates as the pre-compensator in this case. Thus, the trainable parameters of the generator 200 that is trained using the training dataset 10 of the third example can be applied to the distortion compensator 140 that is located before the optical transmission unit 112 to work as the pre-compensator.

<As to Generator 200>

The generator 200 is implemented as an arbitrary machine learning-based model, such as a neural network, a support vector machine, etc. When the generator 200 is implemented as a neural network, it is preferable that the generator 200 includes a set of layers with linear activations and a set of layers with non-linear activations. With this structure, it is possible to model the combined effect of both linear and non-linear distortions. Thus, it is possible to generate the distortion compensator 140 that can compensate for the distortion that is a complex combination of the linear and non-linear distortions. Note that the trainable parameters of the generator 200 may include weights and biases of each layer when the generator 200 is implemented as a neural network.

Figure 6:
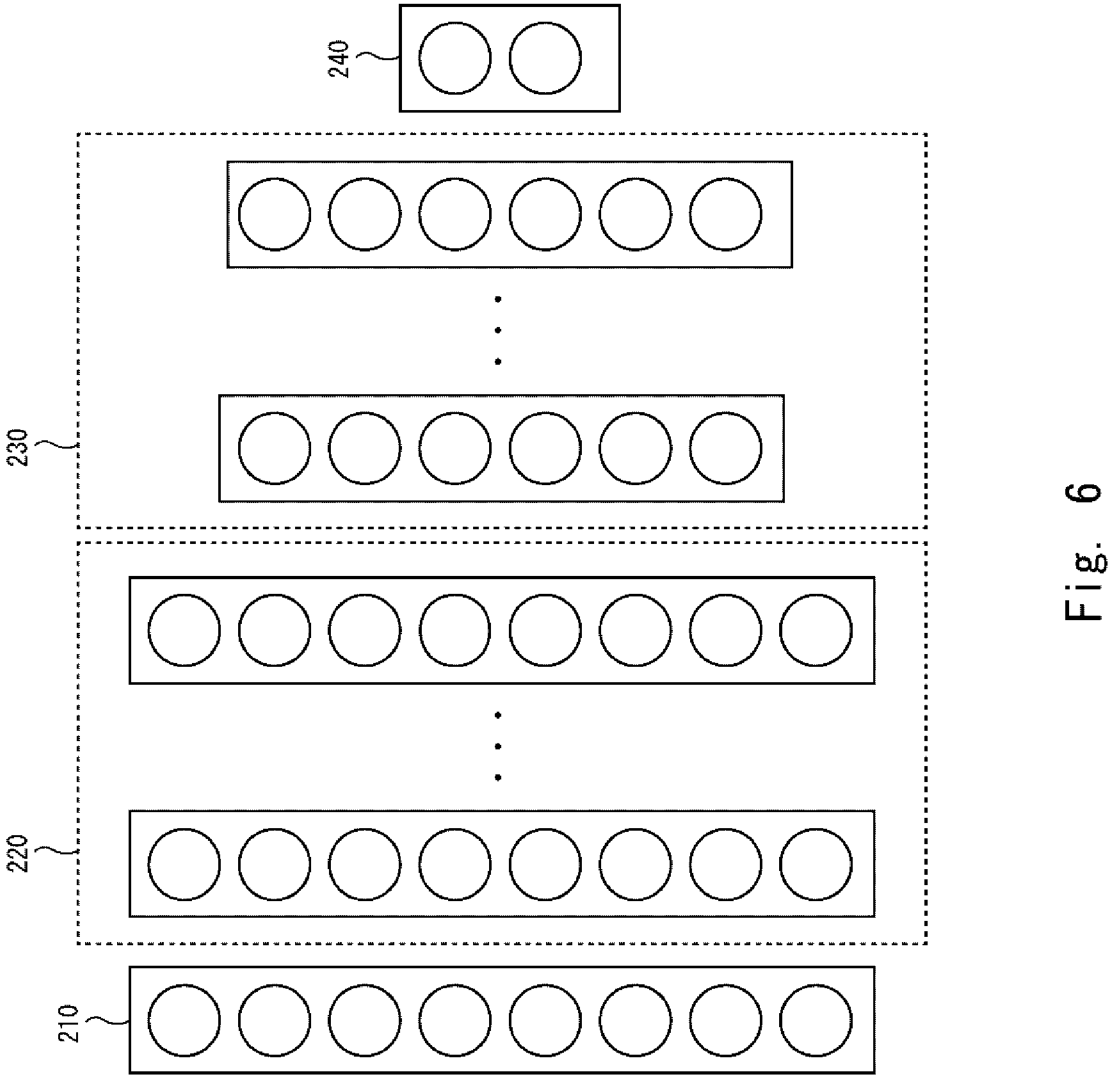
FIG. 6 illustrates an example structure of the generator that includes a set of layers with linear activations and a set of layers with non-linear activations.

FIG. 6 illustrates an example structure of the generator 200 that includes a set of layers with linear activations and a set of layers with non-linear activations. In FIG. 6, the generator 200 includes an input layer 210, a first layer set 220, a second layer set 230, and an output layer 240. Each layer of the layer sets 220 and 230 includes learnable weights with an activation function. Note that, for purpose of brevity, the edges between the layers are not depicted in FIG. 6

The first layer set 220 is a set of layers that has linear activation functions. The second layer set 230 is a set of layers that includes non-linear activation functions, such as a ReLU (Rectified Linear Unit) function.

The size of the output layer 240 is set to the same size as the symbol. In the case where the optical communication system 100 is a single channel optical communication system with single polarization, the size of the symbol is two since it includes the in-phase and quadrature-phase components. Thus, the size of the output layer 240 is set to two. On the other hand, for a dual polarization system, the size of the symbol is four since it includes the in-phase and quadrature-phase components for each of two polarizations. Thus, the size of the output layer 240 may be set to four. Alternatively, the generator 200 may include two separate neural networks: one of which generates a set of the in-phase and quadrature-phase components of X polarization; and the other one of which generates that of Y polarization.

In terms of the input layer 210, it is preferable that the size of the input layer 210 is set to be larger than that of the output layer 240 in order to take the memory aspect in the distortion characteristics into consideration. Suppose that the size of the symbol is two, and the influence of the past (M−1) symbols is taken into consideration. In this case, the size of the output layer 240 is set to two, whereas the size of the input layer 210 is set to 2*M since the input layer 210 is set to have the two components for each of the current symbol and the past (M−1) symbols, i.e. M symbols in total.

Theoretically, the output from the first layer set 220 can be expressed as follows:

Equation 2

$$X_L = W_{L2}(W_{L1}X_{in} + B_{L1}) + B_{L2} \tag{2}$$

where X_L represents the output from the first layer 210, X_in represents data input into the input layer 210; W_L1 and B_L1 respectively represent the weights and the bias corresponding to all layers of the first layer set 220 except its last layer; and W_L2 and B_L2 respectively represent the weights and the bias corresponding to the last layer of the first layer set 220.

In addition, the final output from the generator 200 (i.e. the output from the output layer 240) can be expressed as follows:

Equation 3

$$X_{out} = W_O * f_{NL}(X_L) + B_O \tag{3}$$

where X_out represents the final output of the generator 200, f_NL represents a function modelled by the second layer set 230; and W_O and B_O respectively represent weights and bias corresponding to the last layer 240.

Note that the generator 200 may have a skip connection between the last layer of the first layer set 220 and the last layer of the second layer set 230. In this case, the final output from the generator 200 can be expressed as follows:

Equation 4

$$X_{out} = W_O * f_{NL}(X_L) + B_O + W_L * W_L \tag{4}$$

where W_L represents weights corresponding to the skip connection.

Note that when the generator 200 has the skip connection mentioned above, the last layer of the first layer set 220 is configured to have the same number of nodes as the first layer of the second layer set 230 in order to connect the first layer set 220 with the second layer set 230.

The X_out showcases the characteristics of the function that could be modeled by the generator 200. As described later, the number of learnable weights and layers of the generator 200 is dynamically adjusted, thereby improving the expressive power of this function.

<As to Discriminator 300>

The discriminator 300 may be implemented as an arbitrary machine learning-based model, such as a neural network, a support vector machine, etc. For example, the discriminator 300 implemented as a neural network whose output layer has two nodes that output a one-hot vector representing the result of the classification. Specifically, for example, the output layer outputs the vector (0,1) when the discriminator 300 determines that the data input thereinto is generated by the generator 200, whereas it outputs the vector (1,0) when the discriminator 300 determines that the data input thereinto is the ground truth data 14.

Hereinafter, for clear and concise explanation, the data output from the generator 200 and the ground truth data 14 are also described as being a generated data and a true data, respectively.

<Training of Generator 200 and Discriminator 300: S106>

The training execution unit 2060 executes the training of the model set 400 (S106). Conceptually, the training execution unit 2060 executes a GAN-like training for the model set 400; the generator 200 is trained so as to generate the data that is determined to be the true data by the discriminator 300 whereas the discriminator 300 is trained so as to determine that the data generated by the generator 200 is not the true data.

Figure 7:
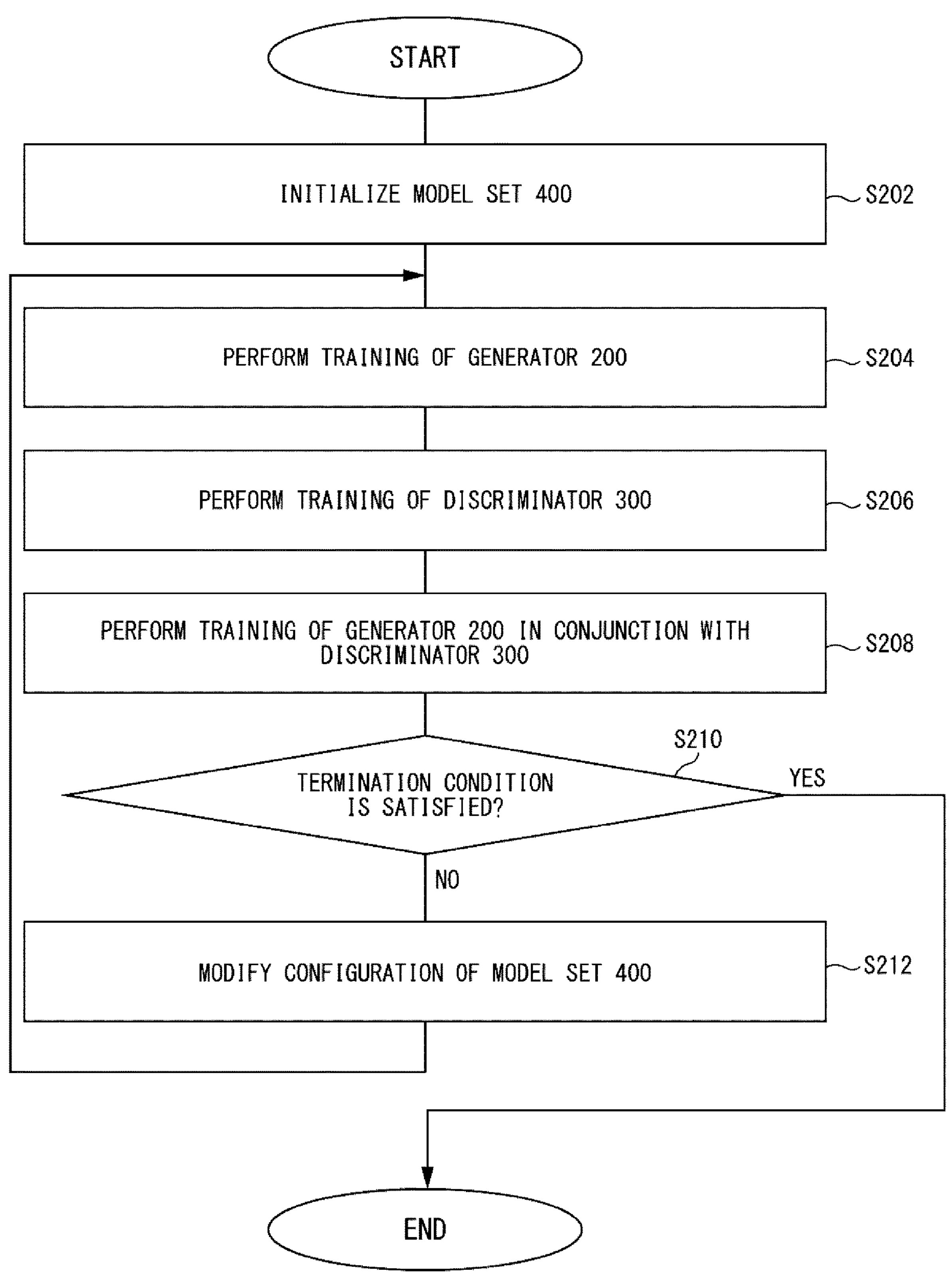
FIG. 7 illustrates an example flow of the training of the model set.

FIG. 7 illustrates an example flow of the training of the model set 400. The training execution unit 2060 initialize the model set 400 (S202). For example, the training execution unit 2060 may acquire hyperparameters of the generator 200, such as the pre-defined sizes of the input and the output, the pre-defined number of nodes in each layer, and the pre-defined number of layers. The training execution unit 2060 initializes the generator 200 with the acquired hyperparameters. The trainable parameters of the generator 200 is also initialized.

The same applies to the discriminator 300. Specifically, the training execution unit 2060 may acquire hyperparameters for the discriminator 300, initialize the discriminator 300 with the acquired hyperparameters, and initialize the trainable parameters of the discriminator 300.

After the initialization of the model set 400, the training execution unit 2060 performs a training of the generator 200 not in conjunction with the discriminator 300 (S204). As mentioned above, the generator 200 is trained using the training dataset 10. For example, for each training dataset 10, the training execution unit 2060 inputs the input data 12 into the generator 200, obtains the output from the generator 200, computes a loss by applying the ground truth data 14 and the output from the generator 200 to a pre-defined loss function, and updates trainable parameters of the generator 200 based on the computed loss.

Next, the training execution unit 2060 performs a training of the discriminator 300 (S206). The discriminator 200 is trained using the ground truth data 14 and the output from the generator 200 that has been trained in Step S204.

Specifically, for each training dataset 10, the training execution unit 2060 inputs the input data 12 into the generator 200, and obtain the output from the generator 200. Then, the training execution unit 2060 inputs the data output from the generator 200 into the discriminator 300, and trains the discriminator 300 so that it determines that the data input thereinto is the generated data.

More specifically, for example, the training execution unit 2060 obtains the output from the discriminator 300, computes a loss by applying the real output from the discriminator 300 and an ideal output to a pre-defined loss function, and updates trainable parameters of the discriminator 300. The ideal output in this case is a data that indicates that the data input into the discriminator 300 is the generated data; e.g. the one-hot vector (0,1) that is described in the above-mentioned explanation of the discriminator 300.

The training execution unit 2060 also inputs the ground truth data 14 into the discriminator 300, and trains the discriminator 300 so that it determines that the data input thereinto is the true data. The trainable parameters of the discriminator 300 can be updated in a way similar to the above-mentioned way of updating those parameters when the data generated by the generator 200 is input into the discriminator 300. Note that, in this case, the ideal output used to compute the loss is a data that indicates that the data input into the discriminator 300 is the true data: e.g. the one-hot vector (1,0) that is described in the above-mentioned explanation of the discriminator 300.

After individual trainings of the generator 200 and the discriminator 300, the training execution unit 2060 performs a training of the generator 200 in conjunction with the discriminator 300 (S208). Specifically, for each training dataset 10, the training execution unit 2060 operates as follows. The training execution unit 2060 inputs the input data 12 into the generator 200 that has been trained in Step 204, and obtains the output from the generator 200. Next, the training execution unit 2060 inputs the output obtained from the generator 200 into the discriminator 300 that has been trained in Step 206, and obtains the output from the discriminator 300. Then the training execution unit 2060 computes a loss and updates the trainable parameters of the generator 200 based on the computed loss. In this case, the loss is computed by applying the real output from the discriminator 300 and an ideal output to a pre-defined loss function. The ideal output in this case is a data that indicates that the data input into the discriminator 300 is the true data: e.g. the one-hot vector (1,0) that is described in the above-mentioned explanation of the discriminator 300.

After finishing Step 208, the training execution unit 2060 determines whether or not a pre-defined termination condition is satisfied (S210). It is possible to employ various kinds of termination conditions. For example, the termination condition may be that "a pre-defined number of iterations of Steps S204 to S212 are completed".

In another example, the termination condition may be that "the performance of the model set 400 achieves a pre-defined goal". The performance of the model set 400 may be computed using a pre-defined loss function. For example, the loss computed in Step 204, 206, or 208 can be used to represent the performance of the model set 400. In this case, for example, the training execution unit 2060 determines that "the performance of the model set 400 achieves a pre-defined goal" when the loss is less than a pre-defined threshold.

If the termination condition is satisfied (S210: YES), the training execution unit 2060 terminates the training of the model set 400. On the other hand, if the termination condition is not satisfied (S210: NO), the training execution unit 2060 performs Step 212.

In Step 212, the training execution unit 2060 modifies the configuration of the model set 400 based on a pre-defined rule (hereinafter, modification rule). The configurations of the model set 400 that are to be modified may be the number of layers of the layer set 220, that of the layer set 230, or both.

It is preferable to appropriately set the modification rule in advance with which the model set 400 can converge to a suited configuration (e.g. the generator 200 has the optimal number of layers in the layer set 220 and the layer set 230). An example of the configuration rule is to: iteratively increases the number of layers of the layer set 230 until the loss becomes less than a threshold; and then iteratively reduce the number of layers in the layer set 220 until the point where the reduction of the number of layers of the layer set 220 leads to an increase in the loss.

The modification of the generator 200 (Step 212) is performed to make the distortion compensator 140 as simple as possible while achieving high accuracy. Specifically, since each optical transmitter may have unique characteristics, there is no single structure (the number of weights and layers) of the distortion compensator 140 that is the most suitable for every optical transmitter. Without considering the complexity of the distortion compensator 140, it is possible to statically configure the generator 200 with a large number of weights and layers. However, the higher the complexity of the generator 200 is, the more computational time and resources the training of the generator 200 requires. In addition, it also reduces the efficiency of the distortion compensator 140.

According to the repetitive modifications of the generator 200, the generator 200 is gradually adjusted to be as simple as possible while maintaining its high accuracy. Thus, it is possible to customize the configuration of the distortion compensator 140 according to the characteristics of the optical transmitter 112 so that it can accurately perform the distortion compensation with less computational time and resources.

After Step S212, Step 204 is performed again. More specifically, Steps 204 to S212 are repeatedly performed until it is determined that the termination condition is satisfied in Step 210.

<Output of Parameter Information: S108>

The output unit 2080 outputs the parameter information 20 (S108). The parameter information 20 includes trainable parameters of the generator 200. As mentioned above, the trainable parameters of the generator 200 being trained can be applied to the distortion compensator 140.

The parameter information 20 may also include the hyper-parameters of the generator 200. In particular, in the case where the configuration of the generator 200 is modified based on the modification rule as mentioned above, the output unit 2080 includes the parameters that is modified based on the modification rule (e.g. the number of layers of the layer set 220 and 230) in the parameter information 20 as well. In this case, the distortion compensation unit 140 is configured to have the number of layers specified by the parameter information 20.

There may be various ways of outputting the parameter information 20. For example, the parameter information 20 is put into a storage device to which the training apparatus 2000 has access. In another example, the parameter information 20 is sent to another computer, such as one configures the distortion compensator 140 using the parameter information 20.

<Another Usage of Parameter Information 20>

The parameter information 20 can be used not only to configure the distortion compensator 140, but also generate a mathematical model of the optical transmission unit 112. In this case, the training dataset 10 may be generated to include the first transmission symbol sequence as the input data 12, and the second transmission symbol sequence or any scaled version of the second transmission sequence as the ground truth data 14. Based on this type of the input data 12, the generator 200 is trained to generate the second transmission symbol from the first transmission symbol (in other words, to generate the distorted signal from the original signal). Thus, the trainable parameters of the learnt generator 200 can be used to generate a model of the optical transmission 112.

Since the training apparatus 2000 performs a GAN-like training for the model set 400, it is possible to accurately train the generator 200. Thus, by using the trainable parameters 200 as the parameters of the mathematical model of the optical transmission unit 112, it is possible to accurately generate the mathematical model of the optical transmission unit 112.

After generating the mathematical model of the optical transmission unit 112, the training apparatus 2000 can generate the second transmission symbol sequence without the optical transmission unit 112. Specifically, the training apparatus 2000 can obtain the second transmission symbol sequence by inputting the first transmission symbol sequence into the mathematical model of the optical transmission unit 112 instead of a real one.

The second transmission symbol sequence that is output from the mathematical model may be used to generate the parameter information 20 that includes the parameters suitable for the distortion compensator 140. Specifically, the training apparatus 2000 generates the training dataset 10 based on the first transmission symbol sequence that is input into the mathematical model and the second transmission symbol that is output from the mathematical model in response to that first transmission symbol sequence being input into the mathematical model. In this time, the training dataset 10 is generated to be suitable for the training of the model set 400 to generate the parameters for the distortion compensator 140. Then, the training apparatus 2000 executes the training of the model set 400 using the training dataset 10 generated here, and generates and outputs the parameter information 20 that includes the parameters of the learnt generator 200.

Although the present disclosure is explained above with reference to example embodiments, the present disclosure is not limited to the above-described example embodiments. Various modifications that can be understood by those skilled in the art can be made to the configuration and details of the present disclosure within the scope of the invention.

The programs mentioned in this disclosure include instructions (or software codes) that, when loaded into a computer, cause the computer to perform one or more of the functions described in the embodiments. The program may be stored in a non-transitory computer readable medium or a tangible storage medium. By way of example, and not a limitation, non-transitory computer readable media or tangible storage media can include a random-access memory (RAM), a read-only memory (ROM), a flash memory, a solid-state drive (SSD) or other types of memory technologies, a CD-ROM, a digital versatile disc (DVD), a Blu-ray disc or other types of optical disc storage, and magnetic cassettes, magnetic tape, magnetic disk storage or other types of magnetic storage devices. The program may be transmitted on a transitory computer readable medium or a communication medium. By way of example, and not a limitation, transitory computer readable media or communication media can include electrical, optical, acoustical, or other forms of propagated signals.

The whole or part of the example embodiments disclosed above can be described as, but not limited to, the following supplementary notes.

SUPPLEMENTARY NOTES

Supplementary Note 1

A training apparatus comprising:

at least one processor; and memory storing instructions;

wherein the at least one processor is configured to execute the instructions to;

acquire a first transmission symbol sequence that is a sequence of symbols to be input to an optical transmission unit included in a transmitter, the optical transmission unit acquiring the first transmission symbol sequence, converting the first transmission symbol sequence into an optical transmission signal, and transmitting the optical transmission signal to a receiver;

acquire a second transmission symbol sequence that is a sequence of symbols that is acquired by demodulating the optical transmission signal;

generate a training dataset including an input data and a ground truth data based on the first and second transmission symbol sequence;

execute a training of a set of a generator and a discriminator using the training dataset, the generator being trained so as to generate a data that is determined as being the ground truth data by the discriminator, the discriminator being trained so as to distinguish the ground truth data and the data generated by the generator; and output parameter information that includes trainable parameters of the generator.

Supplementary Note 2

The training apparatus according to supplementary note 1, wherein the trainable parameters of the generator included in the parameter information is output as parameters to be applied to a pre-compensator that is located before the optical transmission unit in the transmitter or to be applied to a post-compensator that is located after an optical reception unit in the receiver, the optical reception unit receiving the optical transmission signal transmitted by the transmitter and converting the received signal into a sequence of symbols.

Supplementary Note 3

The training apparatus according to supplementary note 1 or 2, wherein the generation of the training data includes:

generating an inverse signal of distortion included in the optical transmission signal based on the second transmission symbol sequence; and generating the training dataset that includes the first transmission symbol sequence as the input data and the inverse signal of the distortion as the ground truth data.

Supplementary Note 4

The training apparatus according to supplementary note 1 or 2, wherein the generation of the training data includes generating the training dataset that includes the second transmission symbol sequence as the input data and the first transmission symbol sequence as the ground truth data.

Supplementary Note 5

The training apparatus according to supplementary note 1 or 2, wherein the generation of the training data includes generating the training dataset that includes the second transmission symbol sequence normalized by a gain thereof as the input data and the first transmission symbol sequence as the ground truth data.

Supplementary Note 6

The training apparatus according to any one of supplementary notes 1 to 5, wherein the generator includes a first set of layers that has linear activation functions and a second set of layers that has non-linear activation functions.

Supplementary Note 7

The training apparatus according to supplementary note 6, wherein the training of the set of the generator and the discriminator includes: modifying a number of layers of the first set of layers, a number of layers of the second set of layers, or both.

Supplementary Note 8

The training apparatus according to supplementary note 6 or 7, wherein the generator includes a skip connection that connects a last layer of the first set of layers and a last layer of the second set of layers.

Supplementary Note 9

The training apparatus according to any one of supplementary notes 1 to 8, wherein the at least one processor is further configured to:

acquire a mathematical model of the optical transmission unit to which the trainable parameters included in the parameter information is applied;

generate the second transmission symbol sequence by inputting the first transmission symbol sequence into the mathematical model;

generate a second training dataset including the input data and the ground truth data based on the first transmission symbol sequence that is input into the mathematical model and the second transmission symbol sequence that is output from the mathematical model;

execute the training of the set of the generator and the discriminator using the second training dataset; and output the parameter information that includes trainable parameters of the generator that is trained using the second training dataset.

Supplementary Note 10

A control method performed by a computer, comprising:

acquiring a first transmission symbol sequence that is a sequence of symbols to be input to an optical transmission unit included in a transmitter, the optical transmission unit acquiring the first transmission symbol sequence, converting the first transmission symbol sequence into an optical transmission signal, and transmitting the optical transmission signal to a receiver;

acquiring a second transmission symbol sequence that is a sequence of symbols that is acquired by demodulating the optical transmission signal;

generating a training dataset including an input data and a ground truth data based on the first and second transmission symbol sequence; executing a training of a set of a generator and a discriminator using the training dataset, the generator being trained so as to generate a data that is determined as being the ground truth data by the discriminator, the discriminator being trained so as to distinguish the ground truth data and the data generated by the generator; and outputting parameter information that includes trainable parameters of the generator.

Supplementary Note 11

The control method according to supplementary note 10, wherein the trainable parameters of the generator included in the parameter information is output as parameters to be applied to a pre-compensator that is located before the optical transmission unit in the transmitter or to be applied to a post-compensator that is located after an optical reception unit in the receiver, the optical reception unit receiving the optical transmission signal transmitted by the transmitter and converting the received signal into a sequence of symbols.

Supplementary Note 12

The control method according to supplementary note 10 or 11, wherein the generation of the training data includes:

generating an inverse signal of distortion included in the optical transmission signal based on the second transmission symbol sequence; and generating the training dataset that includes the first transmission symbol sequence as the input data and the inverse signal of the distortion as the ground truth data.

Supplementary Note 13

The control method according to supplementary note 10 or 11, wherein the generation of the training data includes generating the training dataset that includes the second transmission symbol sequence as the input data and the first transmission symbol sequence as the ground truth data.

Supplementary Note 14

The control method according to supplementary note 10 or 11, wherein the generation of the training data includes generating the training dataset that includes the second transmission symbol sequence normalized by a gain thereof as the input data and the first transmission symbol sequence as the ground truth data.

Supplementary Note 15

The control method according to any one of supplementary notes 10 to 14, wherein the generator includes a first set of layers that has linear activation functions and a second set of layers that has non-linear activation functions.

Supplementary Note 16

The control method according to supplementary note 15, wherein the training of the set of the generator and the discriminator includes: modifying a number of layers of the first set of layers, a number of layers of the second set of layers, or both.

Supplementary Note 17

The control method according to supplementary note 15 or 16, wherein the generator includes a skip connection that connects a last layer of the first set of layers and a last layer of the second set of layers.

Supplementary Note 18

The control method according to any one of supplementary notes 10 to 17, further comprising:

acquiring a mathematical model of the optical transmission unit to which the trainable parameters included in the parameter information is applied;

generating the second transmission symbol sequence by inputting the first transmission symbol sequence into the mathematical model;

generating a second training dataset including the input data and the ground truth data based on the first transmission symbol sequence that is input into the mathematical model and the second transmission symbol sequence that is output from the mathematical model;

executing the training of the set of the generator and the discriminator using the second training dataset; and outputting the parameter information that includes trainable parameters of the generator that is trained using the second training dataset.

Supplementary Note 19

A non-transitory computer-readable storage medium storing a program that causes a computer to execute:

acquiring a first transmission symbol sequence that is a sequence of symbols to be input to an optical transmission unit included in a transmitter, the optical transmission unit acquiring the first transmission symbol sequence, converting the first transmission symbol sequence into an optical transmission signal, and transmitting the optical transmission signal to a receiver;

acquiring a second transmission symbol sequence that is a sequence of symbols that is acquired by demodulating the optical transmission signal;

generating a training dataset including an input data and a ground truth data based on the first and second transmission symbol sequence;

executing a training of a set of a generator and a discriminator using the training dataset, the generator being trained so as to generate a data that is determined as being the ground truth data by the discriminator, the discriminator being trained so as to distinguish the ground truth data and the data generated by the generator; and outputting parameter information that includes trainable parameters of the generator.

Supplementary Note 20

The storage medium according to supplementary note 19, wherein the trainable parameters of the generator included in the parameter information is output as parameters to be applied to a pre-compensator that is located before the optical transmission unit in the transmitter or to be applied to a post-compensator that is located after an optical reception unit in the receiver, the optical reception unit receiving the optical transmission signal transmitted by the transmitter and converting the received signal into a sequence of symbols.

Supplementary Note 21

The storage medium according to supplementary note 19 or 20, wherein the generation of the training data includes:

generating an inverse signal of distortion included in the optical transmission signal based on the second transmission symbol sequence; and generating the training dataset that includes the first transmission symbol sequence as the input data and the inverse signal of the distortion as the ground truth data.

Supplementary Note 22

The storage medium according to supplementary note 19 or 20, wherein the generation of the training data includes generating the training dataset that includes the second transmission symbol sequence as the input data and the first transmission symbol sequence as the ground truth data.

Supplementary Note 23

The storage medium according to supplementary note 19 or 20, wherein the generation of the training data includes generating the training dataset that includes the second transmission symbol sequence normalized by a gain thereof as the input data and the first transmission symbol sequence as the ground truth data.

Supplementary Note 24

The storage medium according to any one of supplementary notes 19 to 23, wherein the generator includes a first set of layers that has linear activation functions and a second set of layers that has non-linear activation functions.

Supplementary Note 25

The storage medium according to supplementary note 24, wherein the training of the set of the generator and the discriminator includes: modifying a number of layers of the first set of layers, a number of layers of the second set of layers, or both.

Supplementary Note 26

The storage medium according to supplementary note 24 or 25, wherein the generator includes a skip connection that connects a last layer of the first set of layers and a last layer of the second set of layers.

Supplementary Note 27

The storage medium according to any one of supplementary notes 19 to 26, wherein the program further causes the computer to execute:

acquiring a mathematical model of the optical transmission unit to which the trainable parameters included in the parameter information is applied;

generating the second transmission symbol sequence by inputting the first transmission symbol sequence into the mathematical model;

generating a second training dataset including the input data and the ground truth data based on the first transmission symbol sequence that is input into the mathematical model and the second transmission symbol sequence that is output from the mathematical model;

executing the training of the set of the generator and the discriminator using the second training dataset; and outputting the parameter information that includes trainable parameters of the generator that is trained using the second training dataset.

REFERENCE SIGNS LIST

10 training data
12 input data
14 ground truth data
20 parameter information
50 intermediate optical reception unit
100 optical communication system
110 transmitter
112 optical transmission unit
120 receiver
122 optical reception unit
130 optical fiber
140 distortion compensator
200 generator
210 input layer
220 first layer set
230 second layer set
240 output layer
300 discriminator
1000 computer
1020 bus
1040 processor
1060 memory
1080 storage device
1100 input/output interface
1120 network interface
2000 training apparatus
2020 acquisition unit
2040 generation unit
2060 training execution unit
2080 output unit

What is claimed is:

1. A training apparatus comprising:

at least one processor; and memory storing instructions;

wherein the at least one processor is configured to execute the instructions to:

acquire a first transmission symbol sequence that is a sequence of symbols to be input to an optical transmission unit included in a transmitter, the optical transmission unit acquiring the first transmission symbol sequence, converting the first transmission symbol sequence into an optical transmission signal, and transmitting the optical transmission signal to a receiver;

acquire a second transmission symbol sequence that is a sequence of symbols that is acquired by demodulating the optical transmission signal;

generate a training dataset including an input data and a ground truth data based on the first and second transmission symbol sequence;

execute a training of a set of a generator and a discriminator using the training dataset, the generator being trained so as to generate a data that is determined as being the ground truth data by the discriminator, the discriminator being trained so as to distinguish the ground truth data and the data generated by the generator; and output parameter information that includes trainable parameters of the generator.

2. The training apparatus according to claim 1, wherein the trainable parameters of the generator included in the parameter information are output as parameters to be applied to a pre-compensator that is located before the optical transmission unit in the transmitter if the generator has a same configuration as the pre-compensator, wherein the trainable parameters of the generator included in the parameter information are output as parameters to be applied to a post-compensator that is located after an optical reception unit in the receiver if the generator has a same configuration as the post-compensator, and wherein the optical reception unit receives the optical transmission signal transmitted by the transmitter and converts the received signal into a sequence of symbols.

3. The training apparatus according to claim 1 wherein the generation of the training data includes:

generating an inverse signal of distortion included in the optical transmission signal based on the second transmission symbol sequence; and generating the training dataset that includes the first transmission symbol sequence as the input data and the inverse signal of the distortion as the ground truth data.

4. The training apparatus according to claim 1, wherein the generation of the training data includes generating the training dataset that includes the second transmission symbol sequence as the input data and the first transmission symbol sequence as the ground truth data.

5. The training apparatus according to claim 1, wherein the generation of the training data includes generating the training dataset that includes the second transmission symbol sequence normalized by a gain thereof as the input data and the first transmission symbol sequence as the ground truth data.

6. The training apparatus according to claim 1, wherein the generator includes a first set of layers that has linear activation functions and a second set of layers that has non-linear activation functions.

7. The training apparatus according to claim 6, wherein the training of the set of the generator and the discriminator includes: modifying a number of layers of the first set of layers, a number of layers of the second set of layers, or both.

8. The training apparatus according to claim 6, wherein the generator includes a skip connection that connects a last layer of the first set of layers and a last layer of the second set of layers.

9. The training apparatus according to claim 1, wherein the at least one processor is further configured to:

acquire a mathematical model of the optical transmission unit to which the trainable parameters included in the parameter information is applied;

generate a simulated transmission symbol sequence by inputting the first transmission symbol sequence into the mathematical model;

generate a second training dataset including the input data and the ground truth data based on the first transmission symbol sequence that is input into the mathematical model and the simulated transmission symbol sequence that is output from the mathematical model;

execute the training of the set of the generator and the discriminator using the second training dataset; and output the parameter information that includes trainable parameters of the generator that is trained using the second training dataset.

10. A control method performed by a computer, comprising:

acquiring a first transmission symbol sequence that is a sequence of symbols to be input to an optical transmission unit included in a transmitter, the optical transmission unit acquiring the first transmission symbol sequence, converting the first transmission symbol sequence into an optical transmission signal, and transmitting the optical transmission signal to a receiver;

acquiring a second transmission symbol sequence that is a sequence of symbols that is acquired by demodulating the optical transmission signal;

generating a training dataset including an input data and a ground truth data based on the first and second transmission symbol sequence;

executing a training of a set of a generator and a discriminator using the training dataset, the generator being trained so as to generate a data that is determined as being the ground truth data by the discriminator, the discriminator being trained so as to distinguish the ground truth data and the data generated by the generator; and outputting parameter information that includes trainable parameters of the generator.

11. The control method according to claim 10, wherein the trainable parameters of the generator included in the parameter information are output as parameters to be applied to a pre-compensator that is located before the optical transmission unit in the transmitter if the generator has a same configuration as the pre-compensator, wherein the trainable parameters of the generator included in the parameter information are output as parameters to be applied to a post-compensator that is located after an optical reception unit in the receiver if the generator has a same configuration as the post-compensator, and wherein the optical reception unit receives the optical transmission signal transmitted by the transmitter and converts the received signal into a sequence of symbols.

12. The control method according to claim 10, wherein the generation of the training data includes:

generating an inverse signal of distortion included in the optical transmission signal based on the second transmission symbol sequence; and generating the training dataset that includes the first transmission symbol sequence as the input data and the inverse signal of the distortion as the ground truth data.

13. The control method according to claim 10, wherein the generation of the training data includes generating the training dataset that includes the second transmission symbol sequence as the input data and the first transmission symbol sequence as the ground truth data.

14. The control method according to claim 10, wherein the generation of the training data includes generating the training dataset that includes the second transmission symbol sequence normalized by a gain thereof as the input data and the first transmission symbol sequence as the ground truth data.

15. The control method according to claim 10, wherein the generator includes a first set of layers that has linear activation functions and a second set of layers that has non-linear activation functions.

16. A non-transitory computer-readable storage medium storing a program that causes a computer to execute:

acquiring a first transmission symbol sequence that is a sequence of symbols to be input to an optical transmission unit included in a transmitter, the optical transmission unit acquiring the first transmission symbol sequence, converting the first transmission symbol sequence into an optical transmission signal, and transmitting the optical transmission signal to a receiver;

acquiring a second transmission symbol sequence that is a sequence of symbols that is acquired by demodulating the optical transmission signal;

generating a training dataset including an input data and a ground truth data based on the first and second transmission symbol sequence;

executing a training of a set of a generator and a discriminator using the training dataset, the generator being trained so as to generate a data that is determined as being the ground truth data by the discriminator, the discriminator being trained so as to distinguish the ground truth data and the data generated by the generator; and outputting parameter information that includes trainable parameters of the generator.

17. The storage medium according to claim 16, wherein the trainable parameters of the generator included in the parameter information are output as parameters to be applied to a pre-compensator that is located before the optical transmission unit in the transmitter if the generator has a same configuration as the pre-compensator, wherein the trainable parameters of the generator included in the parameter information are output as parameters to be applied to a post-compensator that is located after an optical reception unit in the receiver if the generator has a same configuration as the post-compensator, and wherein the optical reception unit receives the optical transmission signal transmitted by the transmitter and converts the received signal into a sequence of symbols.

18. The storage medium according to claim 16, wherein the generation of the training data includes:

generating an inverse signal of distortion included in the optical transmission signal based on the second transmission symbol sequence; and generating the training dataset that includes the first transmission symbol sequence as the input data and the inverse signal of the distortion as the ground truth data.

19. The storage medium according to claim 16, wherein the generation of the training data includes generating the training dataset that includes the second transmission symbol sequence as the input data and the first transmission symbol sequence as the ground truth data.

20. The storage medium according to claim 16, wherein the generation of the training data includes generating the training dataset that includes the second transmission symbol sequence normalized by a gain thereof as the input data and the first transmission symbol sequence as the ground truth data.

* * * * *